United States Patent
Chen

(10) Patent No.: US 6,267,134 B1
(45) Date of Patent: Jul. 31, 2001

(54) WALL MOUNTED MIXER VALVE WITH PRESSURE BALANCE

(75) Inventor: Cheng-Tung Chen, Chang Hwa Hsien (TW)

(73) Assignee: Tai Yi Industrial Co., Ltd., Chang Hwa Hsien (TW)

( * ) Notice: Subject to any disclaimer, the term of this patent is extended or adjusted under 35 U.S.C. 154(b) by 0 days.

(21) Appl. No.: 09/456,572

(22) Filed: Dec. 8, 1999

(51) Int. Cl.[7] .................................................. G05D 11/03
(52) U.S. Cl. .............................................. 137/98; 137/597
(58) Field of Search ..................... 137/98, 100, 625.41, 137/597

(56) References Cited

U.S. PATENT DOCUMENTS

| | | | | |
|---|---|---|---|---|
| 3,192,939 | * | 7/1965 | Moen ................................... | 137/100 |
| 5,299,593 | * | 4/1994 | Ottelli ................................. | 137/100 |
| 5,355,906 | * | 10/1994 | Marty et al. ........................... | 137/98 |
| 5,725,010 | * | 3/1998 | Marty et al. .......................... | 137/100 |
| 5,740,836 | * | 4/1998 | Tang ................................ | 137/625.41 |
| 5,884,653 | * | 3/1999 | Orlandi ................................ | 137/100 |

* cited by examiner

Primary Examiner—Stephen M. Hepperle
(74) Attorney, Agent, or Firm—Rosenberg, Klein & Lee

(57) ABSTRACT

A wall mounted mixer valve with pressure balance to automatically suspend the supply of hot water once the pressure of cold water drops to prevent accidental burning by hot water is essentially comprised of a body, a pressure balance device, a ball assembly, a washer, a packing cover, a cylinder, a bonnet, a rose, and a handle; within, an accommodation slot and a water outlet are provided in a base inside the body, an water inlet is each provided respectively to one edge of two shallow grooves in the middle section of said slot and a water outlet is each provided to the external side of said two grooves; a shutoff valve is protruded from the bottom of said slot with the inner edge of said shutoff valve internally threaded; the pressure balance device is comprised of an outer sleeve, an inner sleeve and a lid with the center and both RH and LH ends of said outer sleeve each provided with a packing retainer ring, one perforated spacer slot is each provided on the wall among said three packing retainer ring, a hollow external threaded section protrudes from one end of the outer sleeve; a partition is provided in the center of the inner sleeve, one perforated spacer slot is also each provided on the wall of both sides of the partition, one end section of the lid is externally threaded while two water outlet gaps facing to each other are provided on the other end section, and a graded edge internally threaded is provided in the internal surface of the end.

2 Claims, 7 Drawing Sheets

WALL MOUNTED MIXER VALVE WITH PRESSURE BALANCE

BACKGROUND OF THE INVENTION

1. Field of the Invention

The present invention relates to a wall mounted mixer valve with pressure balance device, and more particularly, to a mixer valve that prevents the user from being burnt due to pressure drop by cold water without affecting the normal water outlet amount, attracting deposit of sediment nor the complete suspension of water supply.

2. Description of the Prior Art

As illustrated in FIG. 1, the prior art of a mixer valve is essentially comprised of a handle 1, a bonnet 2, a connection bolt, a control valve, a rose 3, a cylinder 4, a mixer valve 5, a large washer, a spout 6a and a shower-bath 6b. When assembled, the mixer valve 5 is mounted in the preserved wall openings to be respectively connected to cold water and water inlets and two water outlets, another ends of said two water outlets are respectively connected to the spout 6a and the shower-bath 6b. The control valve is placed with the mixer valve 5, and the cylinder 4 is inserted and secured at the outer edge of the mixer valve 5. The large wash is inserted into the inner edge of the rose 3, then the rose 3 together with the large washer is secured with two screws to the circumference of the openings preserved on the wall. The front side of the cylinder 4 is made protruding out of the center hole in the rose 3, then one end of the connection bolt is inserted into and fixed at the terminal of a control valve rod from the control valve. The bonnet 2 is placed in the front side of the central hole in the rose 3 and fixed at the front end of the mixer valve 5. The handle 1 is placed onto the front side of the bonnet 2 and is secured at the other end of the connection bolt with a screw to operate the control valve in the mixer valve 5 to form an assembly.

The prior art of a mixer valve adjusts for a proper temperature of mixed water supply simply by control and adjustment of the mixing ratio between cold and hot water. However, the average tap user suffers low pressure of water supply as a pressure motor is required to boost the line water pressure, and the water pressure drops suddenly if water closet or tap water is in use at the same time. As a result, there is the reduction of cold water supply while hot water remains its original mixing ratio. Accordingly, the user suffers a sudden surge of the temperature of hot water and may get burnt while taking a shower.

SUMMARY OF THE INVENTION

The primary objective of the present invention is to provide a wall mounted mixer valve provided with a pressure balance device comprised of an outer sleeve, an inner sleeve and a lid. At both LR and RH sides of the walls to said outer and inner sleeves are provided with perforated spacer slots so that both hot and cold water are respectively entering into the lines through said perforated slots before being mixed. Once the pressure of cold water supply drops, a partition provided in the center of the inner sleeve is pushed inward to leave from its symmetrical position by the pressure of hot water. Meanwhile the hot water supply is suspended due to that the perforated spacer slots to the outer sleeve operate in the other direction so to prevent the user from being burnt.

Another objective of the present invention is to provide a wall mounted mixer valve provided with a pressure balance device. Within, the perforated slots to both outer and inner sleeves can effectively interact to prevent deposit of foreign matters to facilitate the water flows directly through partition in the inner sleeve and both outlets of the inner sleeve without affecting the consistent flow of the mixed water.

Another objective yet of the present invention is to provide a wall mounted mixer valve provided with a pressure balance device. Within, both ends of the outer sleeve indicates hollow so that when the water flows from the outer sleeve into the inner sleeve, no sediment will be created and deposited at both ends of the outer sleeve to block the water flow. In turn the force to push against the partition in the inner sleeve will not be impeded, so to ensure of a balanced inner sleeve and the constant mixing ratio of the water flow.

Another objective yet of the present invention is to provide a wall mounted mixer valve provided with a pressure balance device. Within, when the pressure of cold water drops due to that other water outlets in the same piping system are operating, the flow of hot water is moving towards the lid as the inner sleeve is pushed and the perforated slot of the outer sleeve to permit entering of hot water is closed by the inner sleeve. Meanwhile, cold water continues to flow into the outer and inner sleeves to prevent the embarrassment of no water supply at all.

BRIEF DESCRIPTION OF THE DRAWINGS

FIG. 2-1 is a blown-up view of a portion of FIG. 2;

DETAILED DESCRIPTION OF THE INVENTION

Figure 1:
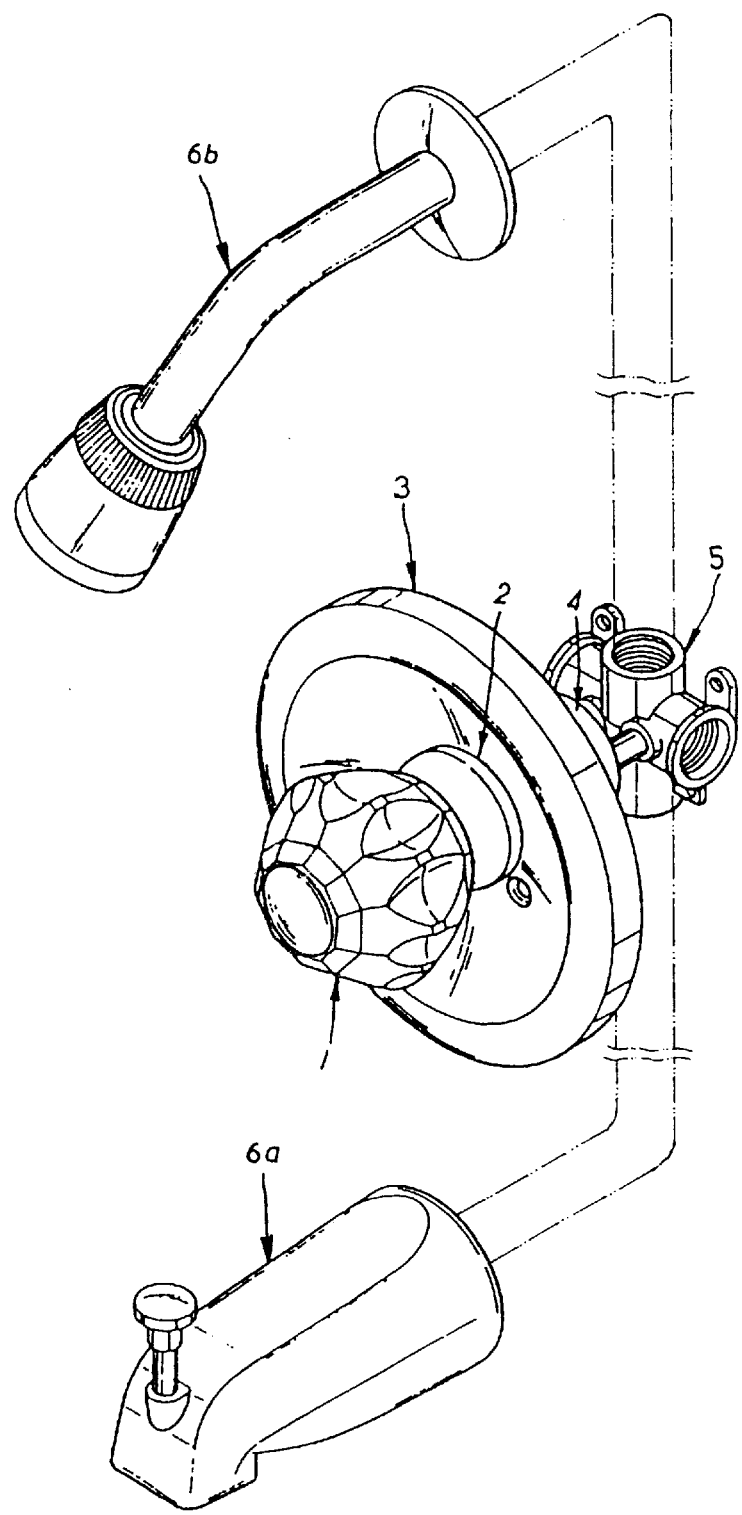
FIG. 1 is a view of an assembly of a prior art.
Figure 2:
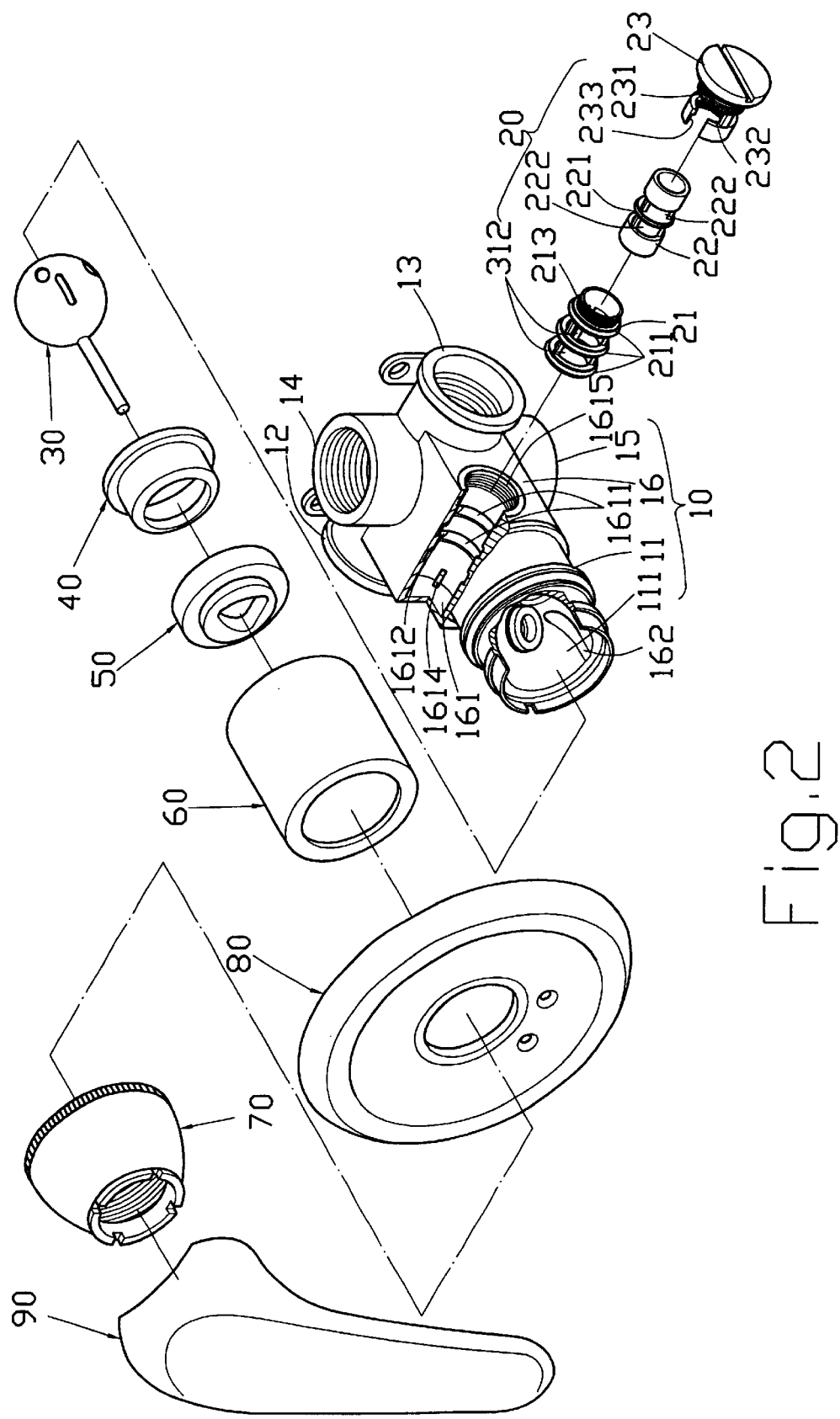
FIG. 2 is an exploded view of the present invention.
Figures 1, 2:
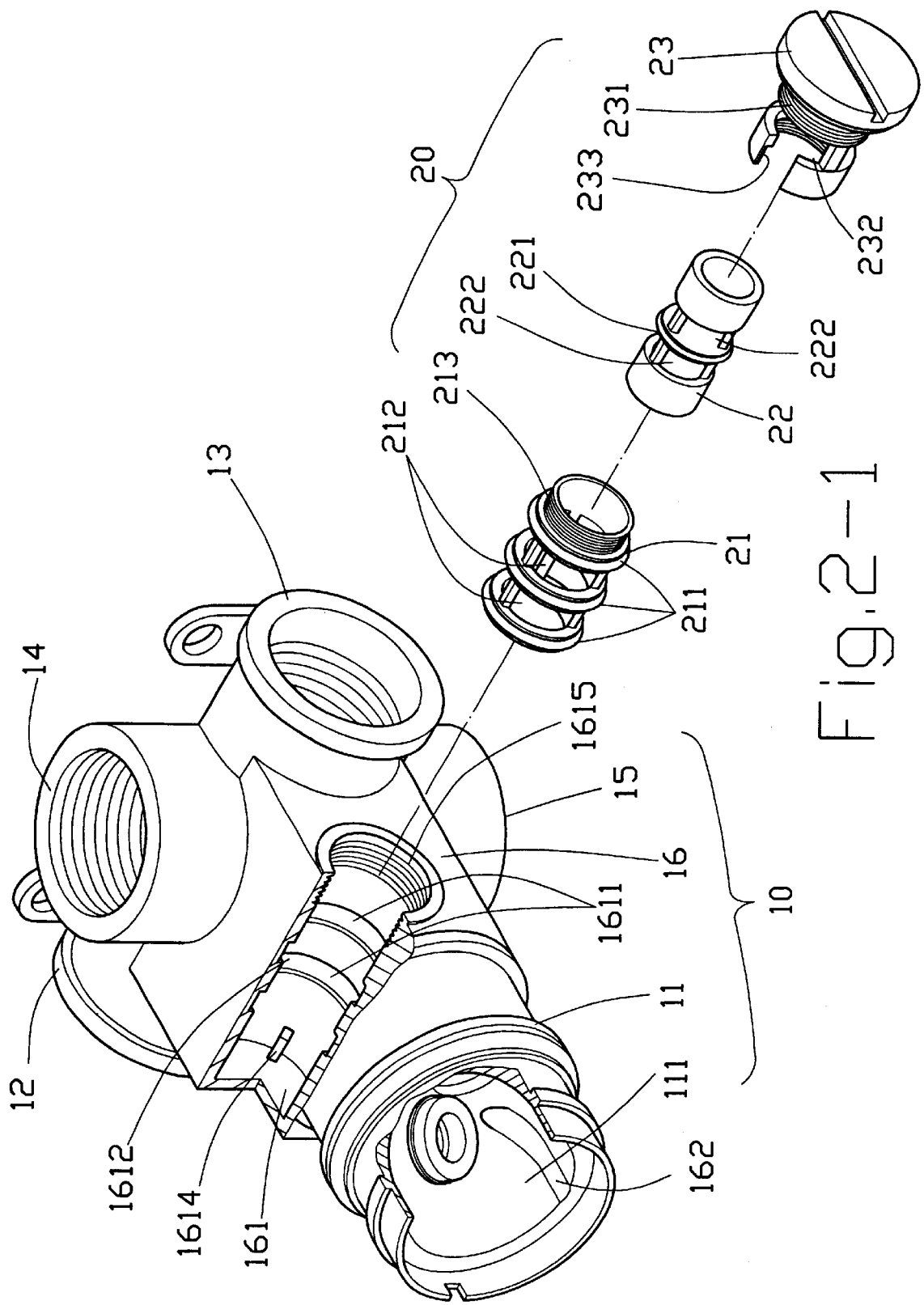

Referring to FIGS. 2 and 2-1, a preferred embodiment of the present invention is comprised of a body (10) a pressure balance device (20), a ball assembly (30), a washer (40), a packing cover (50), a cylinder (60), a bonnet (70), a rose (80), and a handle (90). Wherein, a mixing chamber (111) is provided in a mixer valve seat (11) at the front section of the body (10). Both RH and LH sides of the rear section of the body (10) are separately provided with cold and hot water inlet couplings (12) (13) while a shower-bath outlet coupling (14) and a spout outlet coupling (15) both connected through are provided at the upper and the lower ends of the rear section of the body (10). A base (16) is provided in the middle section of the body (10), a circular accommodation slot (161) and a outlet channel (162) penetrating through the chamber (111) and the spout outlet coupling (15) are provided inside the base (16). Two shallow circular slots (1611) are provided in the middle section of the accommodation slot (161). One side edge each of said circular slots is provided with a water inlet (1612) which is connected to cold and hot water couplings (12, 13) respectively. One outlet (1613) connected to the chamber (111) of the mixer valve seat (11) is each provided on the outer side of said two shallow circular slots (1611). A shutoff valve (1614) is protruding from the bottom of the accommodation slot (161) which is internally threaded (1615) at its inner edge. The pressure balance device (20) is comprised of an outer sleeve (21), an inner sleeve (22) and a lid (23). One packing ring (211) is inserted each to both RH and LH ends and at the center of said outer sleeve (21) while one ring spacer perforated slot (212) is each provided on the wall between two packing ring (211). A hollow threaded section (213) with smaller inner diameter protrudes from one end of the outer sleeve (21),. A partition (221) is placed at the center in the inner sleeve (22). A ring perforated spacer slot (222) is each provided on the wall at both RH and LH sides of the partition (221), one end section of the lid (23) is externally threaded (231) while the other end section is provided with two corresponding water outlet gaps (232) and a graded edge (233) with internal threads is provided inside the end section.

Figure 3A:
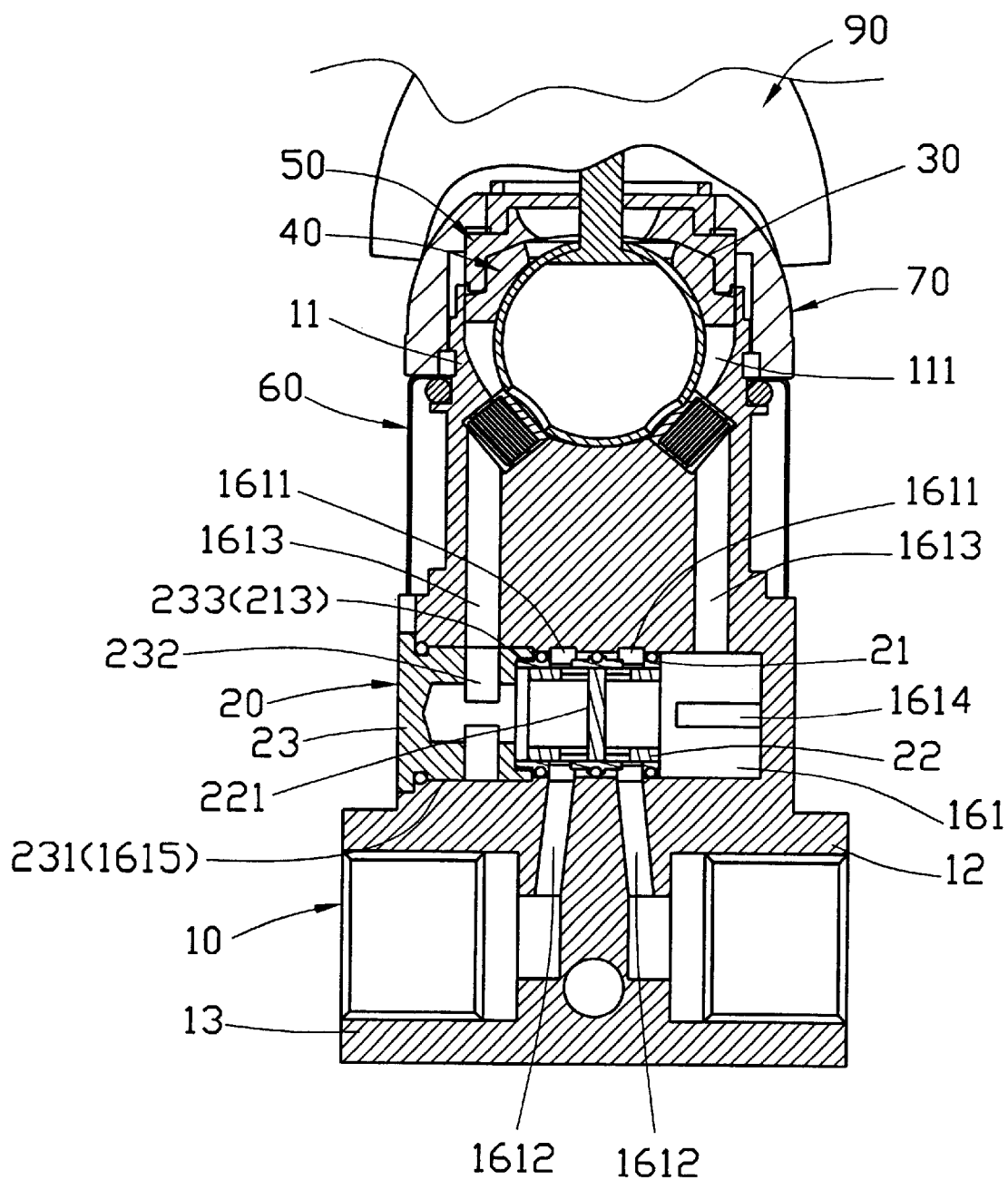
FIG. 3A is a front sectional view of the present invention.
Figure 3B:
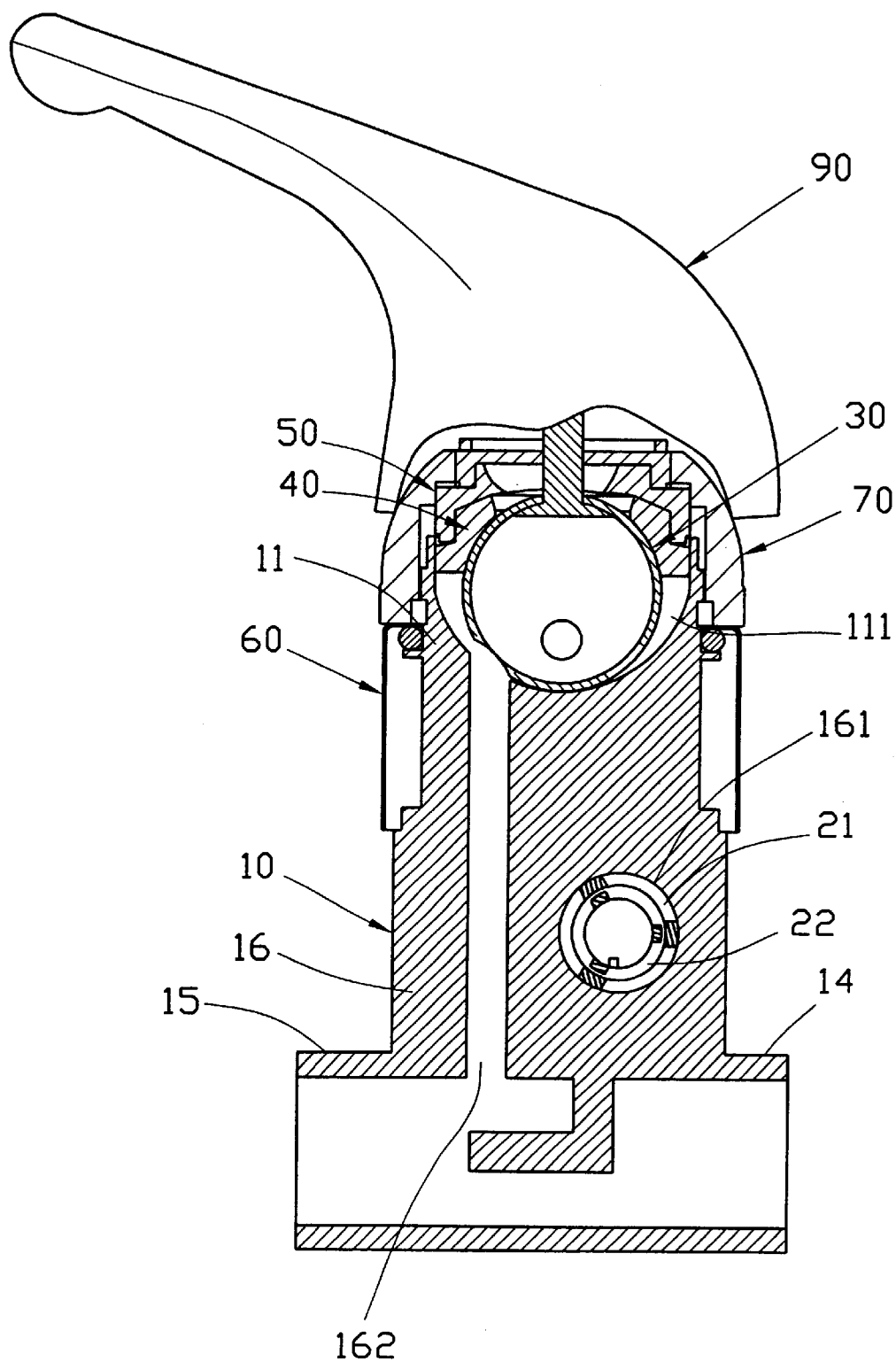
FIG. 3B is a side sectional view of the present invention.

As illustrated in FIGS. 3A and 3B, upon assembling, the hollow section with external threads (213) of the outer sleeve (211) in the pressure balance device (2) is secured with the graded edge with internal threads (233) of the lid (23).

The inner and outer sleeves (22, 21) are engaged one inserted into the other, then received in the accommodation slot (161) at the base (16) of the body (10) and fastened to the inner threads (1615) of the accommodation slot (161) with the external threads (231) from the lid (23). The perforated slots (212) of the outer sleeve (21) are corresponding to two circular shallow slots (1611) from the perforated and two water inlets (1612) from the middle section of the accommodation slots (211). The ball assembly (30), the washer (40) and the packing cover (50) are inserted in sequence into the chamber (111) to the mixer valve seat (11) of the body (10), and the cylinder (60) is inserted to the outer edge of the mixer valve seat (11) of the body (10) and locked up to the frond end of the mixer valve seat (11) of the body (10) with the bonnet (70) immediately followed by inserting the rose (80) onto the outer edge of the cylinder (60). Then the handle (90) is mounted to the bonnet (70) to link to the operation by a control lever of the ball assembly (30), thus to complete the assembly of the present invention.

Figure 4:
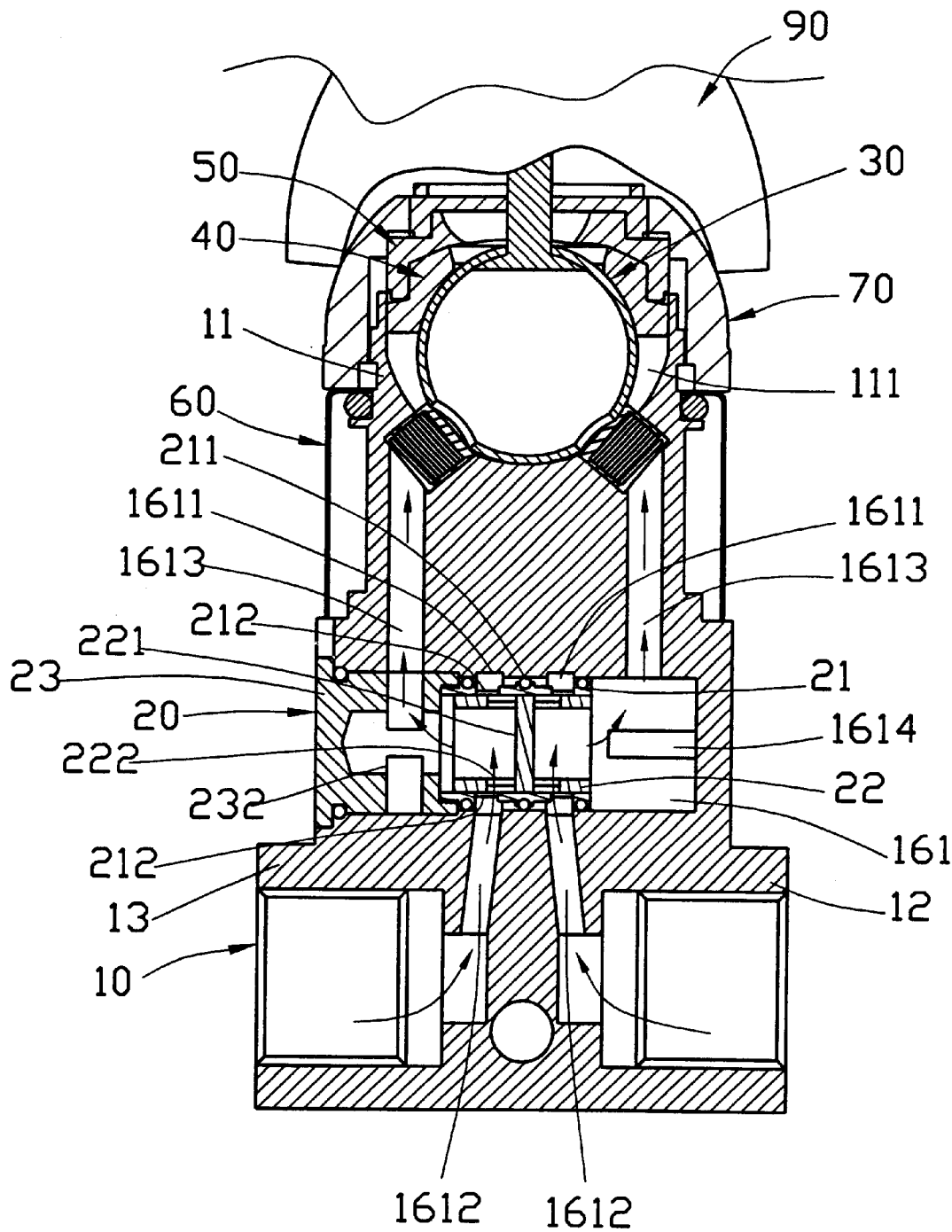
FIG. 4 is a sectional view of the present invention in its normal water supply condition.

FIG. 4 is a sectional view of the present invention in the normal state of water supply. When the pressure of water supply from both sides maintains constant, cold water and hot water enters simultaneously from their corresponding couplings (12, 13) in the body (10) and flow in sequence through both water inlets (1612) of the accommodation slot (161), both perforated slots (212) of the outer sleeve (21) and both perforated slots (222) of the inner sleeve (22 ) before entering into the inner sleeve (22) and maintain balanced under the blocking by the central partition (221) in the inner sleeve (22). Cold water and hot water then respectively flow out from one end of the inner sleeve and the outlet gaps (232) of the lid (23) at the other end of the inner sleeve (22). Then both of cold and hot water flow into the mixing chamber (111) in the mixer valve seat (11) through both water outlets (1613) of the accommodation slot (161) to be mixed in the valve assembly (30). After mixing, the water flows from the water outlet (162) to the spout coupling (15), then either flows out from the spout coupling (15) or the shower-bath outlet coupling (14).

Figure 5:
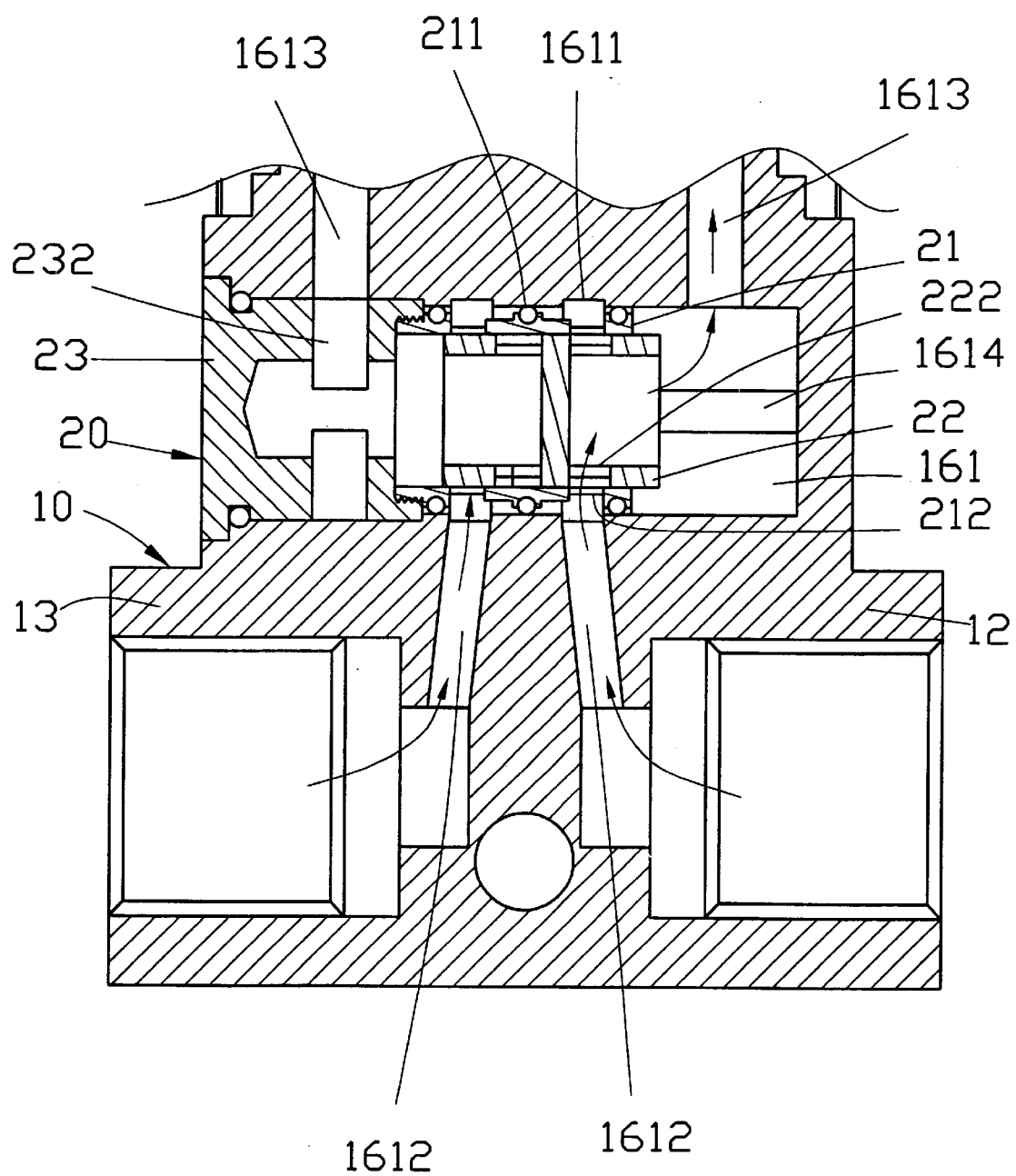
FIG. 5 is a sectional view of the present invention when hot water supply is blocked.

FIG. 5 shows the sectional view of the present invention in the state that the hot water is blocked. When the pressure of cold water drops due to that other outlets in the same piping system are in the use, the central partition (221) in the inner sleeve (22) is pushed away from its symmetrical position towards inside by the pressure of hot water, and held against the shutoff valve (1614) of the accommodation slot (161). As a result, those perforated slots (222, 212) from the inner and outer sleeves (22, 21) are not connected through thus to suspend the hot water from entering into the inner sleeve while only cold water flows out from the inner sleeve (22), through one water outlet (1613) of the accommodation slot and into the mixing chamber (111) of the mixer valve seat (11). Finally, the cold water flows out either through the spout outlet coupling (15) or the shower-bath outlet coupling (14) to prevent the user from being burnt by hot water.

I claim:

1. A mixer valve system comprising:

(a) a body having a plurality of coupling portions extending from a base portion, said coupling portions including: mixer valve seat, cold water inlet coupling, hot water inlet coupling, shower-bath outlet coupling, and spout outlet coupling portions; said mixer valve seat defining a mixing chamber;

said base portion having formed therein an axially extended circular accommodation slot and a pair of shallow circular slots extending annularly about and intermediate section thereof, said base portion having formed therein a pair of water inlet passages and a pair of water outlet passages, said water inlet passages extending respectively between said cold and how water inlet coupling portions and said shallow circular slots, said water outlet passages each extending between said accommodation slot and said mixing chamber, said base portion further having formed within said accommodation slot a threaded inner edge section and a bottom section having a shutoff valve member protruding axially therefrom; and, (b) a pressure balance device disposed within said accommodation slot of said base portion of said body, said pressure balance device including:

(1) an outer sleeve having a plurality of solid sections, adjacent ones of said solid sections defining therebetween a perforated slot section, said outer sleeve having formed at an axial end thereof an externally threaded hollow section;

(2) an inner sleeve disposed in coaxially displaceable manner within said outer sleeve for displacement relative to said outer sleeve between open and shutoff positions, said inner sleeve having formed therein a pair of perforated slot sections separated one from the other by an intermediate partition disposed therebetween, each said inner sleeve perforated slot section in said open position communicating with one said outer sleeve perforated slot section, at least one said inner sleeve perforated slot section in said shutoff position being blocked by one said outer sleeve solid section, said inner sleeve in said shutoff position abutting said axially protruding shutoff valve member; and, (3) a lid threadedly engaging said externally threaded hollow section of said outer sleeve, said lid having formed therein a plurality of water outlet gaps communicating with at least one of said water outlet passages;

whereby said pressure balance device is automatically displaceable responsive to relative water pressures developed on opposing sides of said intermediate partition thereof to, in said open position, concurrently pass the flow of hot and cold water respectively from said water inlet coupling portions thereof to said mixing chamber, and to, in said shutoff position, block the flow of water at least from one of said water inlet coupling portions to said mixing chamber.

2. The mixer valve system as recited in claim 1 further comprising:
   (a) a ball assembly displaceably coupled to said mixing chamber of said mixer valve seat portion of said body;
   (b) a washer coupled to said ball assembly;
   (c) a packing cover coupled to said washer;
   (d) a cylinder disposed coaxially about said mixer valve seat portion;
   (e) a bonnet retentively secured to said mixer valve seat portion;
   (f) a rose coupled to said cylinder; and,
   (g) a handle coupled to said bonnet and operably connected to a portion of said ball assembly for actuating manipulation thereof.

* * * * *